United States Patent [19]

Hehl

[11] Patent Number: 4,846,664
[45] Date of Patent: Jul. 11, 1989

[54] HYDRAULIC SYSTEM FOR THE MOLD CLAMPING UNIT OF A PLASTICS INJECTION MOLDING MACHINE

[76] Inventor: Karl Hehl, Arthur-Hehl-Str. 32, D-7298 Lossburg, Fed. Rep. of Germany

[21] Appl. No.: 137,023

[22] Filed: Dec. 23, 1987

[30] Foreign Application Priority Data

Dec. 23, 1986 [DE] Fed. Rep. of Germany ....... 3644181

[51] Int. Cl.$^4$ .............................................. B29C 45/67
[52] U.S. Cl. .................................... 425/589; 264/405; 425/590
[58] Field of Search ............... 425/150, 589, 590, 149; 264/40.5

[56] References Cited

U.S. PATENT DOCUMENTS

| | | | |
|---|---|---|---|
| 4,131,596 | 12/1978 | Allen | 425/150 |
| 4,380,427 | 4/1983 | Hehl | 425/590 |
| 4,565,116 | 1/1986 | Hehl | 425/590 |

FOREIGN PATENT DOCUMENTS 1171757 7/1984 Canada .

Primary Examiner—Jay H. Woo
Assistant Examiner—Timothy W. Heitbrink
Attorney, Agent, or Firm—Foley & Lardner, Schwartz, Jeffery, Schwaab, Mack, Blumenthal & Evans

[57] ABSTRACT

A hydraulic actuator assembly for use in a mold clamping unit of an injection molding machine. The actuator assembly serves as a rapid-travel drive for mold opening and closing movements and as a source of elevated mold clamping pressure. Among the hydraulic elements contributing to the operation of the mold clamping unit are a power piston for effecting elevated mold clamping pressures and a drive piston for effecting rapid die closing movements. With the hydraulic actuator system of the present invention, it is possible to control the operation of the mold clamping unit based on two-sided hydraulic influencing of the power piston and the drive piston.

11 Claims, 8 Drawing Sheets

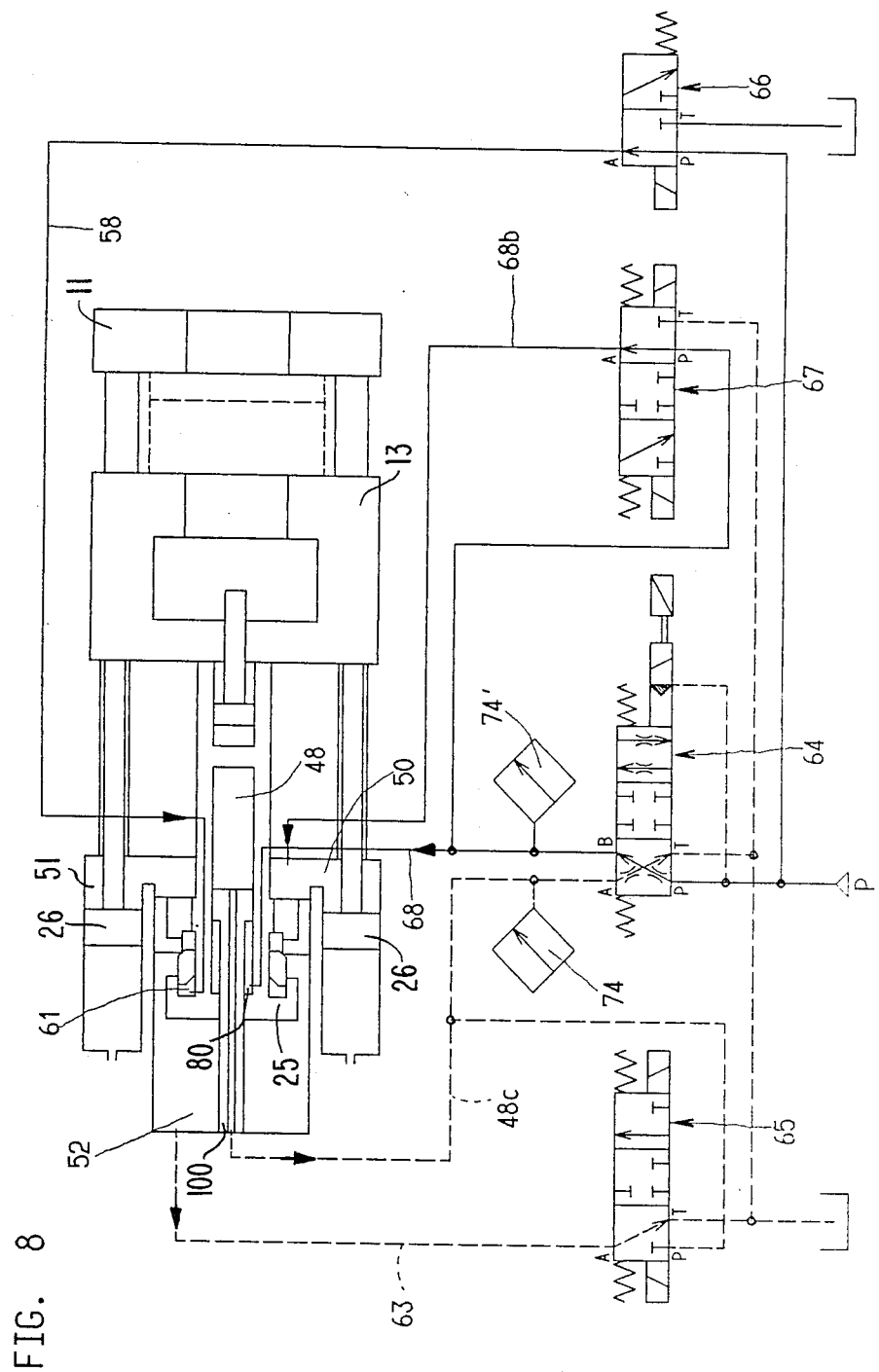

HYDRAULIC SYSTEM FOR THE MOLD CLAMPING UNIT OF A PLASTICS INJECTION MOLDING MACHINE

BACKGROUND OF THE INVENTION

The present invention relates to a hydraulic actuator assembly for the mold clamping unit of an injection molding machine. The actuator assembly provides a rapid-travel drive for mold opening and closing movements. It also provides a source of elevated mold clamping pressure.

In a hydraulic actuator assembly of the present type, there is a power cylinder, which is arranged in the axis of the mold clamping unit for building up the locking pressure for the injection mold. The cylinder spaces of the power cylinder are bounded by the power piston to create a high pressure space and a low pressure space. These two cylinder spaces are interconnected via overflow passages of the power piston, which overflow passages can be shut off by means of a hydraulically operable valve. A hydraulic drive cylinder with a stationary ram effects rapid closing of the injection mold. The actual cylinder of the hydraulic cylinder is formed by the piston rod of the hydraulic power cylinder. The actuator assembly has two single-acting travel cylinders arranged diametrically with respect to the hydraulic power cylinder. The travel cylinders have pistons for receiving and/or delivering hydraulic oil coming from the power cylinder or to be delivered to the same. The low pressure space of the power cylinder is in open connection with the cylinder spaces of the travel cylinders. The pistons of the travel cylinders and the power piston are each connected via the associated piston rods to the mold platen of the mold clamping unit. The actuator assembly has a control valve controlling the opening movement and the closing movement of the drive cylinder via a position detector in the form of a linear displacement voltage transformer in accordance with a quantity program, which quantity program is overridden by a pressure control via a pressure sensor.

A "quantity program" in the above sense controls the speeds of the drive cylinder on the basis of the actual values determined by the linear displacement voltage transformer.

A pressure program, overriding this speed control in the sense of the context of the present invention, has the effect that, when the admissible pressure envisaged by the program has been reached, the pressure program is automatically executed, which takes place on the basis of the actual values supplied by the associated pressure sensor.

"Control valve" in the sense of the context of the present invention is to be understood as a valve with a sliding valve member, which is known per se. The control valve is capable, together with a linear displacement voltage transformer and a pressure sensor, of developing a controlled pressure on the feed side and also on the delivery side of the control valve.

In the case of a known hydraulic system of this type according to U.S. Pat. No. 4,380,427, corresponding to West German Patent Specification No. 3,044,137, which patents are hereby incorporated herein by reference, the prerequisites exist for an extremely short yet nevertheless powerful mold clamping unit, with which it is not necessary to direct the entire displaced hydraulic oil to the reservoir during every opening or closing stroke of the mold clamping unit. The transition from the closing period of the mold clamping unit to its locking period is also not problematic to the extent that the closing stroke is exclusively effected by a clamping unit which is blocked off hydraulically from the power cylinder and the clamping force of the drive cylinder continues to act unchanged during the locking period.

It is also known from U.S. Pat. No. 4,565,116, corresponding to West German Patent Specification No. 3,238,111, which patents are hereby incorporated herein by reference, to control the flow cross-section of the connecting passages in a hydraulic system of the general type being considered, between the low pressure space of the power cylinder and the cylinder spaces of the travel cylinders, by an electrically adjustable throttle valve in dependence on a predetermined operating program. By such a further development, heavy mold clamping units can also be operated at high speed without any malfunctions. On the other hand, even in cases where low travelling speed is needed, a smooth, i.e. surge-free, running of the mold platen is ensured. In addition, it is possible to use the mold clamping unit position-independently. The speed sequence of the closing and opening movements and the time allocation for the braking phases can run according to a program. An injection mold which is difficult to open can be opened with increased force, without an additional ram-cylinder unit being necessary.

The throttle valve exhibiting these advantages and its installation in the mold clamping unit are, however, relatively costly, especially as certain connecting passages to be controlled must lead via the valve arranged outside the power cylinder. For this, passage bores have to be incorporated in the assembly block bearing the hydraulic system with the aid of cores during casting of said block. It has been found that such construction processes are difficult to master.

For further information with respect to these background aspects of the present invention, particularly the quantity program, pressure program, electromagnetically operated control valve, and voltage converter, see Canadian Patent No. 1,177,757, which is hereby incorporated herein by reference.

SUMMARY OF THE INVENTION

Against this background, the invention is based on the object of further developing a hydraulic system of the type mentioned earlier in such a way that the advantages achieved by the system of U.S. Pat. No. 4,565,116 can be achieved, by means of control technology, with increased precision and better adaptability to the respective operating requirements, while avoiding a throttle valve.

This object is achieved according to the invention by the features now to be summarized.

The hydraulic actuator assembly of the present invention is for use in a mold clamping unit of an injection molding machine as a rapid-travel drive for mold opening and closing movements. It also provides a source of elevated mold clamping pressure. The mold clamping unit includes a movable mold platen guided for mold opening and closing travel.

The hydraulic actuator assembly includes a power cylinder for exerting elevated die closing pressures. The power cylinder has a power piston and a power piston rod coupled with the movable mold platen. The power piston divides the power cylinder into a high pressure space on a rear side of the piston and a low pressure space on a forward side of the piston. The power piston has a hollow interior.

The actuator assembly also includes a hydraulic drive cylinder having a stationary hydraulic drive cylinder piston. The hydraulic drive cylinder is for rapid die closing. Also, the hydraulic cylinder is partially formed by the hollow interior of the power piston.

Also included are a pair of compensating cylinders for die opening. Each compensating cylinder has a piston on a piston rod, which piston rod is connected with the movable mold platen for movement in unison with the power piston. Each compensating cylinder includes a cylinder pressure space on one side of the piston.

A flow connection effects communication between the low pressure space of the power cylinder and the cylinder pressure space.

The actuator assembly also includes a control valve, a displacement detector, which preferably takes the form of a linear displacement voltage transformer, for detecting displacements of the movable mold platen. The displacement detector is coupled with the control valve. The hydraulic actuator assembly includes means for providing a quantity program, the quantity program means being coupled with the control valve. The control valve controls the opening movement and closing movement of the travel cylinder via the displacement detector. A pressure control selectively overrides the quantity program means, the pressure control including a pressure sensor coupled with the control valve.

The stationary hydraulic drive cylinder piston is a double-acting piston with a feed side and, opposite the feed side, a delivery side. The feed side of the drive cylinder piston partially defines a feed side cylinder space of the drive cylinder. The delivery side of the drive cylinder piston partially defines a delivery side cylinder space of the drive cylinder. A feed side connecting passage connects the control valve with the feed side cylinder space. The delivery side connecting passage connects the control valve with the delivery side cylinder space. The control valve communicates with both the feed side and the delivery side of the stationary hydraulic drive cylinder piston for determining the drive speeds of the drive cylinder in the closing and opening directions, with simultaneous pressure influencing on both sides of the cylinder in accordance with the quantity program via the displacement detector detecting the movements of the movable mold platen.

The hydraulic actuator assembly includes a first multi-way slide valve and a first branching connecting passage communicating with the multi-way slide valve. The first branching connecting passage connects the first multi-way slide valve with the delivery side connecting passage associated with the control valve. The delivery side connecting passage connects the control valve with the delivery side cylinder space of the drive cylinder. The first branching connecting passage also connects the first multi-way slide valve with the low pressure space of the power cylinder. The delivery side connecting passage associated with the control valve selectively communicates with the low pressure space of the power cylinder via the first multi-way slide valve.

The hydraulic actuator assembly also includes a second multi-way slide valve, a second branching connecting passage communicating with the multi-way slide valve, and a hydraulic fluid reservoir connected with the first multi-way slide valve. The second branching connecting passage connects the second multi-way slide valve with the feed side connecting passages associated with the control valve. The second branching connecting passage also connects the second multi-way slide valve with the high pressure space of the power cylinder. With this arrangement, the feed side connecting passage associated with the control valve selectively communicates with the high pressure space of the power cylinder via the second multi-way slide valve, at which time the low pressure space of the power cylinder is switched into communication with the reservoir via the first multi-way slide valve.

The power piston includes a bypass channel connecting the high and low pressure spaces of the power cylinder, the power cylinder including a plunger cooperating with the power piston for selectively opening and closing the bypass channel. The plunger takes the form of a simple cylindrical sleeve.

The drive cylinder is defined at its end remote from the mold by a rear cover, the rear cover including an axial ring flange. The axial ring flange overlaps the cylindrical sleeve which forms the plunger for controlling the bypass channel of the power piston.

In the case of such a design, the production costs can be considerably reduced in comparison with the hydraulic system of U.S. Pat. No. 4,565,116, because the hitherto necessary throttle valve is eliminated. A more precise mode of operation and a better adaptability of the hydraulic system is produced by the fact that all movements of the drive cylinder and, where appropriate, the locking pressure are each effected by a hydraulic force which results from the difference between opposing, controlled pressures in the drive cylinder and in the power cylinder. The design of the tubular ram 43 controlling the overflow passages in the ram 25 of the pressure cylinder 20, 25 as a simple cylindrical sleeve, ensures an extremely high controlling speed according to U.S. Pat. No. 4,565,116.

BRIEF DESCRIPTION OF THE DRAWINGS

The invention is explained below in the case of an exemplary embodiment with reference to the accompanying drawings, in which:

FIGS. 5–8 show the circuits of the hydraulic system, also in schematic representation.

DETAILED DESCRIPTION OF THE PREFERRED EMBODIMENT

Figure 1:
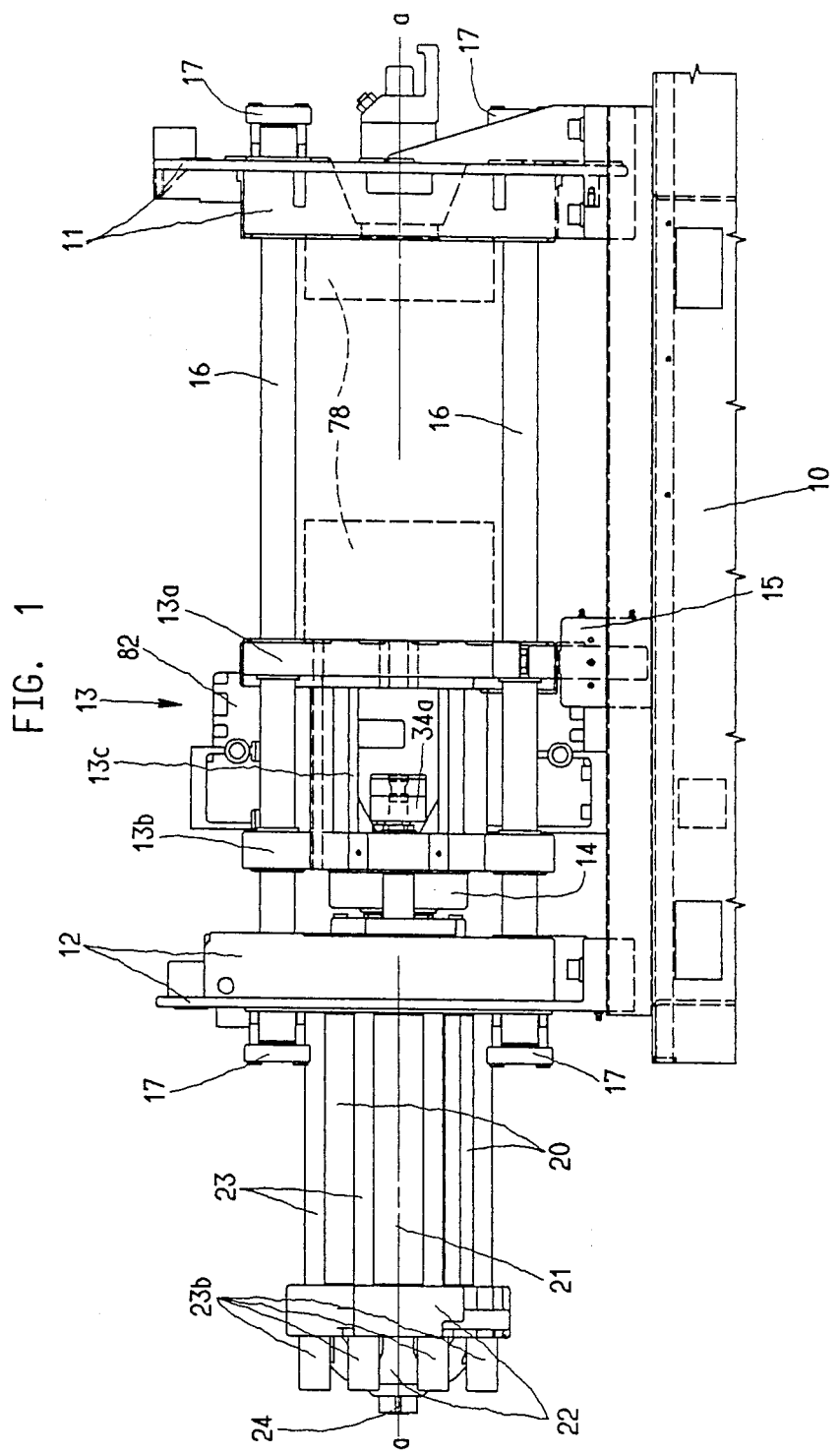
FIG. 1 is a side elevation of the mold clamping unit of an injection molding machine featuring the hydraulic actuator assembly of the present invention.

A stationary mold platen 11 and an assembly plate 12 are fixed on a machine base 10 and connected to one another via tie bars 16 to form a rigid frame. For this purpose, fixing devices 17 are provided at the free ends of the tie bars 16. A movable mold platen 13, having a front pressure transferring wall 13a, a rear pressure receiving wall 13b and reinforcing ribs 13c, is displaceably mounted on the tie bars 16. The mold platen 13 is supported by slide shoes 15 on slide rails of the machine base 10.

The hydraulic system comprises a hydraulic power cylinder 102, including a cylinder 20 and a power piston 25 arranged in the axis a-a of the mold clamping unit for building up the locking pressure for the injection mold 78. The cylinder spaces bounded by the power piston 25, i.e., high pressure space 52 and low pressure space 50, are in communication with each other via bypass channels 42 of the power piston 25. The bypass channels 42 can be shut off by means of a hydraulically operable valve, which is described in detail further below.

A hydraulic drive cylinder 100 lying in the axis a-a of the mold clamping unit and having a stationary piston 47b makes the rapid closing and opening of the injection mold 78 possible. The actual cylinder of the drive cylinder 100 is formed by the piston rod 27 of the hydraulic power cylinder 102.

Two piston cylinder units arranged diametrically with respect to the hydraulic pressure cylinder 20, 25 serve as compensating cylinders 104. Their pistons 26 are only single-acting. The compensating cylinders 104 serve to receive or deliver hydraulic oil coming from the power cylinder 20, 25 or to be delivered to the same. The low pressure space 50 is in open connection with the cylinder spaces 51 of the compensating cylinders 104. The pistons 26 of the compensating cylinders 104 and of the power piston 25 are each connected via their associated piston rods 28, 27 to the movable mold platen 13. At the same time, the piston rod 27 bears against the pressure receiving wall 13b of the mold platen 13 via a central manifold plate 14.

The piston 47b of the drive cylinder 100 is designed as a double-acting piston. The drive speed of the drive cylinder can be determined in accordance with a program by a synchronous pressure control in the connecting passages 48c, 68, each provided with a pressure sensor 74, 74', which connecting passages lead from a control valve 64 of the hydraulic system to the two cylinder spaces 48, 80 of the drive cylinder 100.

Figure 3:
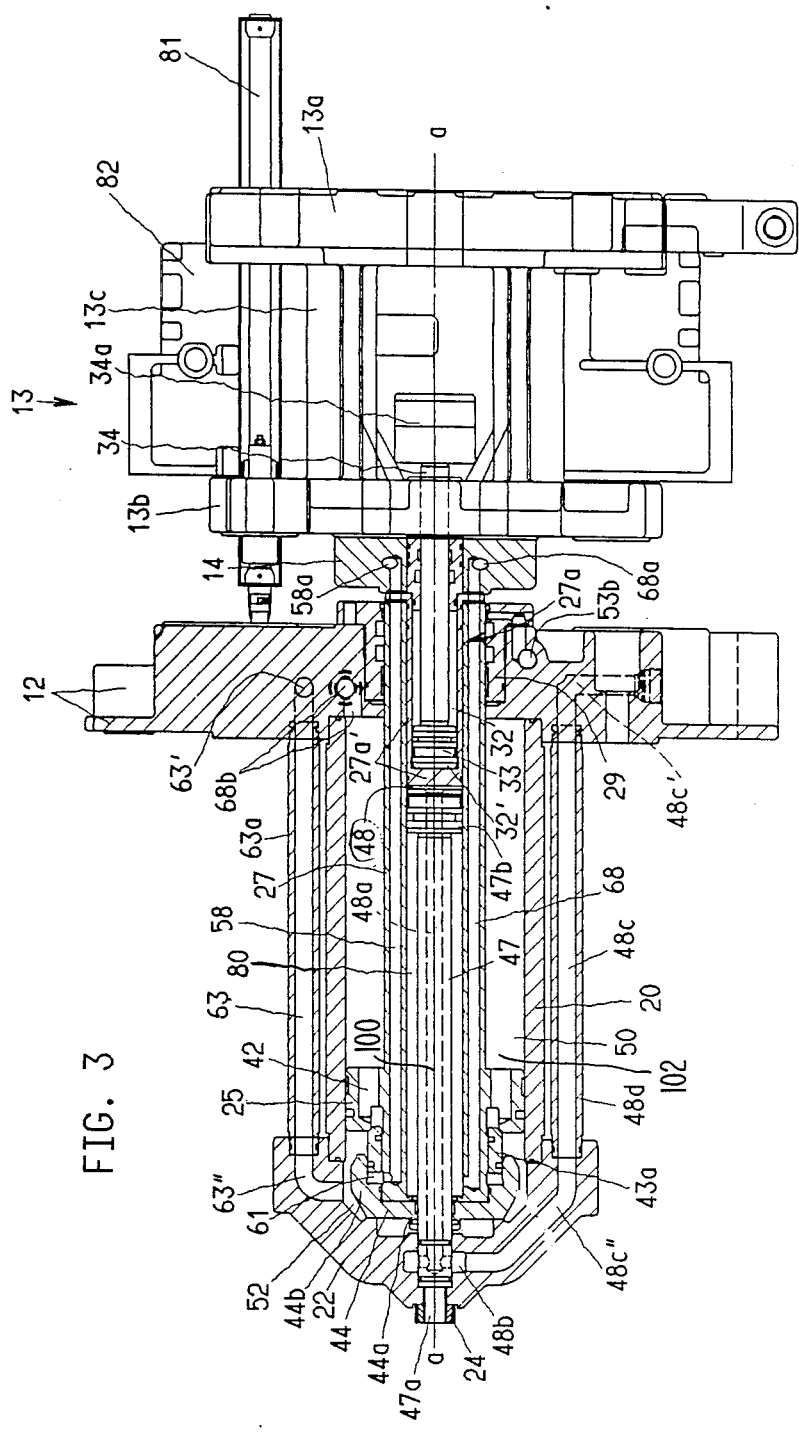
FIG. 3 shows the drive system according to FIG. 2, in section through the axis of the mold clamping unit.

As can be seen in particular in FIG. 3, both a section of the connecting passage 48c to the cylinder space 48 of the drive cylinder 100 on the mold side, i.e., the cylinder space on the feed side of piston 47b, and also a section of the connecting passage 63 to the high pressure space 52 are designed as sleeves 48d and 63a, respectively. The sleeves 48d and 63a connect respective passage bores 48c and 63—the bores being in the stationary assembly plate 12 which bears the hydraulic system and which is formed by a cast block—to respective passage bores 48c" and 63" in a rear cylinder flange 22. The actual cylinders 20 and 21 of the power cylinder 102 and of the compensating cylinders 104 are formed by steel sleeves, which are received, and in each case centered, on the mold side by the assembly plate 12 and at the rear by a cylinder flange 22. This produces an extremely compact design for the hydraulic system, further details of the structure and mode of operation of which are still to be given. Reference numerals 29 and 30 are the covers of the power cylinder and the travel cylinders.

Hydraulically passive atmospheric spaces 53 of the compensating cylinders 104 are bounded at the rear by air permeable covers 55 in the cylinder flange 22. Openings for an oil leakage drain are denoted by reference numeral 53a. An electric displacement detector, taking the form of a linear displacement voltage transformer 81, which detects the movements of the ram rod, is arranged on an archway-like assembly bracket 82 for the protective shroud of the mold clamping unit. The drive cylinder is covered by means of cup-like cover 44 which is passed through centrally and in sealing fashion by the piston rod 47. At the same time, a ring flange 44a, which enters the bore of the piston rod 27 serving as a cylinder at the rear in sealing fashion, bounds the cylinder space 80. An axial ring flange 44b of the cover 44 surrounds the rear end of the piston rod 27 and bounds a cylinder space 61, which is formed by an axial, annular recess of the axial ring flange 44b. An inner cylindrical surface area of the axial ring flange 44b in the region of the recess serves as an outer slide bearing for a tubular plunger 43a of the valve controlling the overflow passages 42 in the case of the power piston 25.

Figure 2:
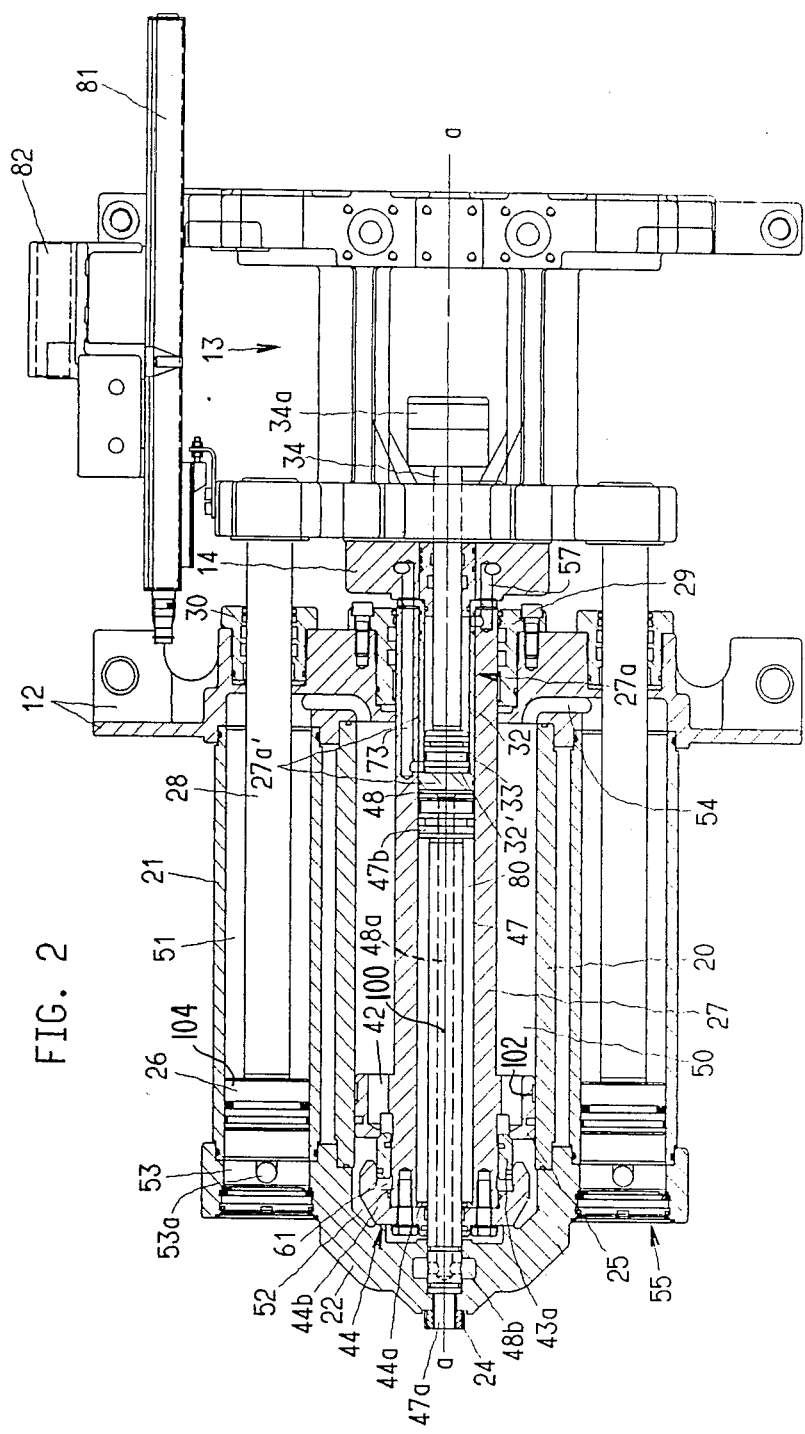
FIG. 2 shows the hydraulic actuator assembly in enlarged representation in horizontal section through the axis of the mold clamping unit (the movable mold platen being in the rear position)

The tubular plunger 43a is designed as a simple sleeve with cylindrical inner and outer surface areas. This sleeve is slidably mounted on an end section of the power piston rod 27, which end section extends rearward from the power piston 25. The valve seat of the valve is formed by an annular edge of the power piston, as can be seen in FIGS. 2, 3. The valve controls the hydraulic oil flows managed by it in a like manner on its feed side and delivery side.

The connecting passages leading from and to the cylinder spaces 61, 80, 52, 48 and the intercommunicating cylinder spaces 50, 51 will be described more specifically as follows.

Figure 4:
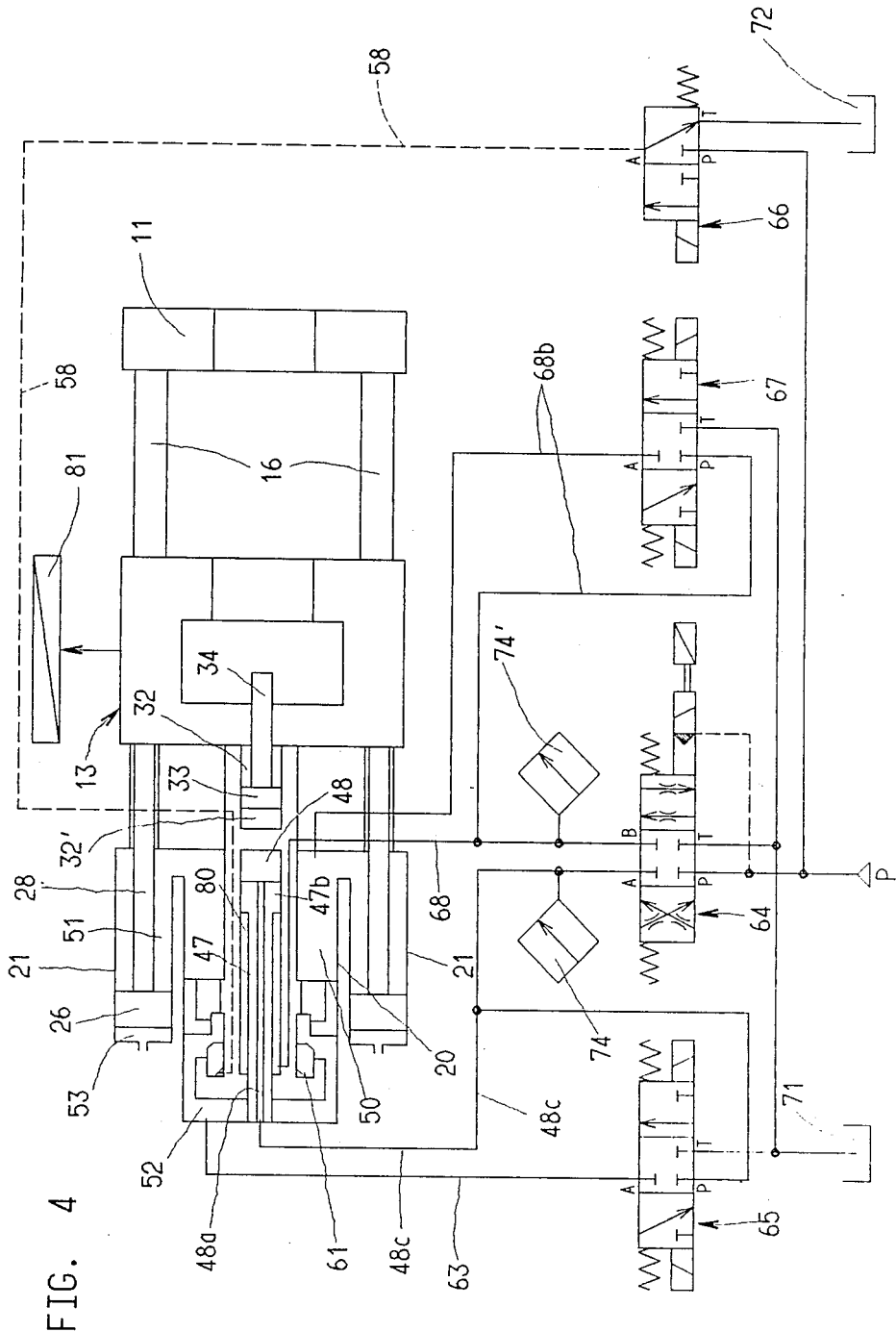
FIG. 4 shows the hydraulic circuit of the drive system in schematic representation.

The annular cylinder space 61 can be put in connection with the pressure line P with the aid of a slide valve 66 via the connecting passage 58, which comprises an axial bore in the power piston rod 27 and a passage bore 58a in the pressure plate 14. The cylinder space 80 (i.e., the delivery side cylinder space of the drive cylinder) can be put in connection with the pressure line P via the connecting line 68 (i.e., a delivery line connecting passage) and the control valve 64 (FIGS. 4, 5), which connecting line includes the one axial bore in the power piston rod 27 and passage bore 68a in the manifold plate 14. As can be seen in FIGS. 4, 6, the high pressure space 52 can be put in connection with the connecting passage 48c (i.e., the feed side connecting passage), connected to pressure line P during closing of the injection mold 78. This is accomplished with the aid of the multi-way slide valve 65 via a connecting passage 63 (i.e., the second branching connecting passage), which connecting passage 63 comprises passage bores 63', 63" in the assembly plate 12 and in the cylinder flange 22 and also a sleeve 63a connecting the said passage bores, and which branches off from the connecting passage.

The cylinder space 48 of the drive cylinder 100 on the mold side (i.e., the feed side cylinder space) can be put in connection with the pressure line P via the connecting passage 48c (i.e., the feed side connecting passage), with the aid of an electromagnetically operated control valve 64 (FIGS. 4, 7), which connecting passage 48c includes an axial bore in the piston rod 47, an annular passage 48b in the cylinder flange 22 and passage bores 48c' and 48c" in the assembly plate 12 and in the cylinder flange 22 as well as a sleeve 48d, which interconnects the said passage bores.

As can be seen in particular in FIGS. 4 and 8, the two cylinder spaces 50, 51 of the power cylinder 102 and of the compensating cylinders 104, communicating with each other via the overflow passages 54, can be connected to the pressure line P with the aid of the control valve 64 and the slide valve 67 (i.e., the first slide valve) via a connecting passage 68b (i.e., a first branching connecting passage), which comprises a passage bore (68b in FIG. 3) in the assembly plate.

The cylinder space 48 of the drive cylinder 100 is bounded on the mold side (i.e., the feed side) by a cup-like shaped piece 27a', fitted sealingly in a hollow interior of piston rod 27. A ejection piston 33 is guided in this shaped piece 27a,. The shaped piece 27a', forms with the ejection piston 33 a hydraulic ejection cylinder 27a, with the aid of which the finished moldings can be ejected from the open injection mold 78. An ejection piston rod 34 of the ejection piston 33 can be coupled by means of a coupling 34a to a connecting rod (not shown in the drawing) leading to the ejection members of the injection mold 78. The cylinder spaces 32, 32' of the hydraulic ejection cylinder 27a can be charged with pressure medium via passage bores 57, 73, as can be seen in FIG. 2.

In the diagram according to FIGS. 4, 8, it is clearly illustrated that the connecting passage 68 leading from the control valve 64 to the cylinder space 80 of the drive cylinder 100 can be put in connection with the pressure line P via a branching connecting passage 68b, with the aid of the slide valve 67. (This condition effects opening of the injection mold 78 with a large cylinder area.)

The connecting passage 48c leading from the control valve 64 to the cylinder space 48 of the drive cylinder 100 can be put in connection with the high pressure space 52 via a branching connecting passage (63 in FIG. 3), which connecting passage 63 is managed by the multi-way slide valve 65 (i.e., the second multi-way slide valve).

In FIGS. 5-8, the flow paths of the hydraulic oil during opening of the injection mold with small force (FIG. 5), during opening of the injection mold with large force (FIG. 8), during closing of the injection mold (FIG. 7), and during locking of the injection mold (FIG. 6) are clearly illustrated. In this case, the lines in connection with the pressure line P are shown in solid lines, and the lines in connection with the reservoir are shown in broken lines.

It should be pointed out in this connection that the valve controlling the bypass channels 42 in the pressure ram 25 is open during opening and closing of the injection mold (in other words during travelling of the movable mold platen 13), so that, during closing of the injection mold, the hydraulic oil can bypass from the cylinder spaces 50, 51 into the high pressure space 52, which is not under high pressure in this case and that, during opening of the injection mold, the hydraulic oil can bypass from the high pressure space into the cylinder spaces 50, 51. This achieves the effect that at least the majority of the hydraulic oil only has to cover short distances within the hydraulic system during opening and closing of the injection mold and, in any case does not have to be passed via the reservoir 71, 72.

Figure 5:
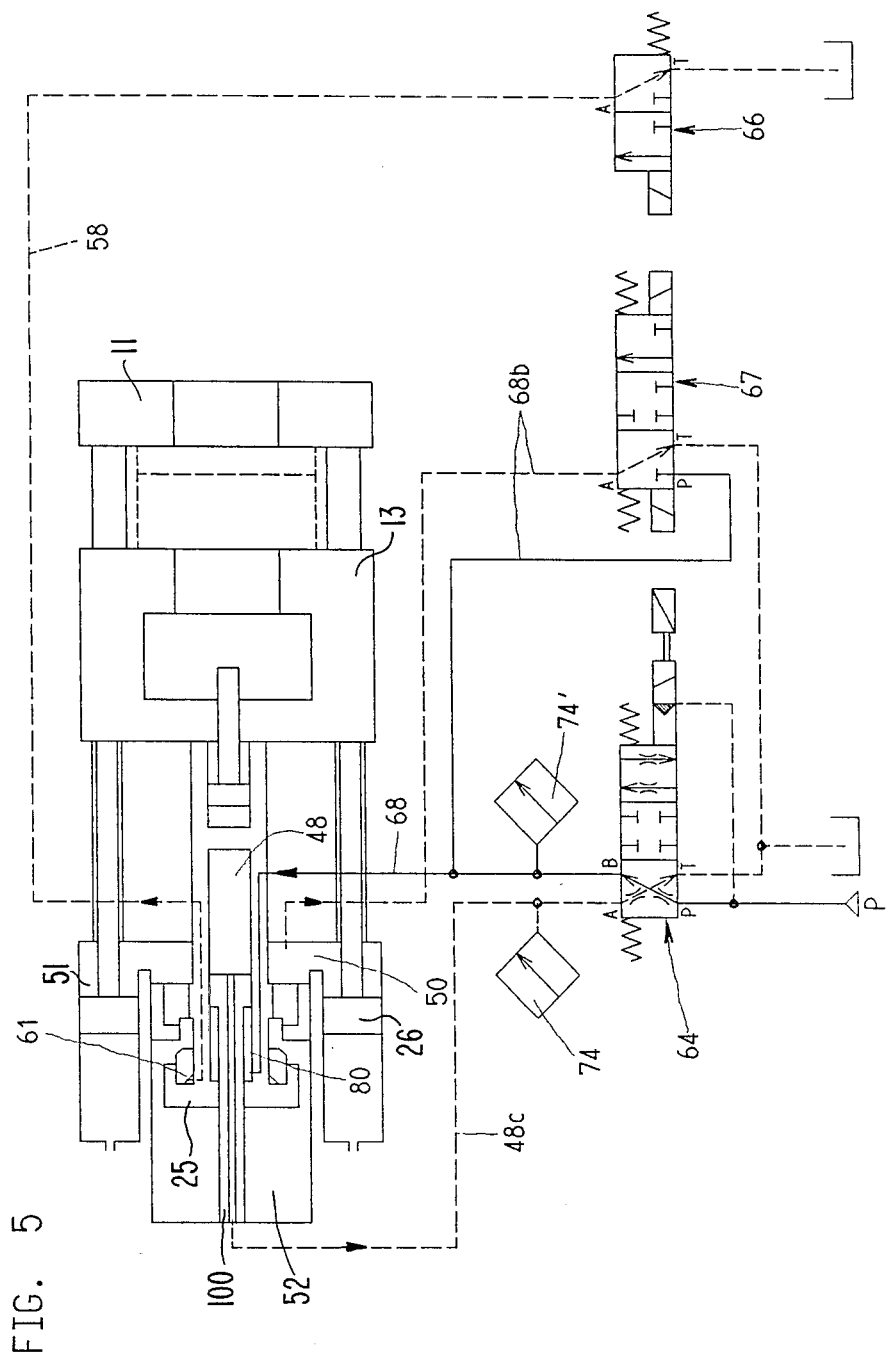
Figure 6:
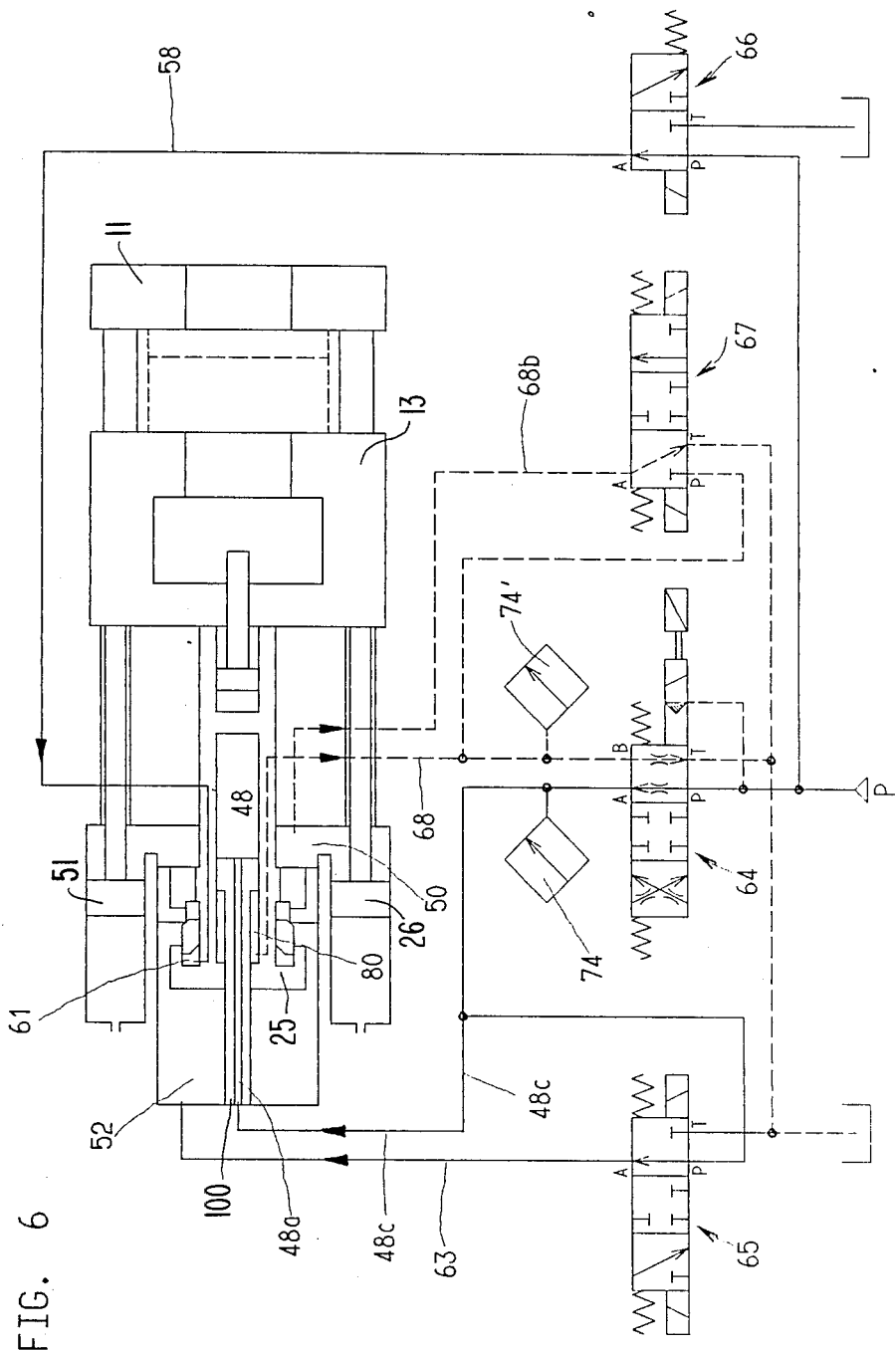

If the injection mold 78 is difficult to open, in the very first phase, with a closed bypass channel 42, it is opened slightly as in FIG. 8, with a large cylinder area, in order then to be moved into open position with a small force, as in FIG. 5.

All functions which can be executed by the hydraulic system can be controlled in accordance with a program with the aid of the control valve 64 and the slide valves 65-67. It should be taken into account here that, during opening (FIG. 5) and closing (FIG. 7) of the injection mold, the drive piston 47b of the drive cylinder 100 is generally impinged on both sides in each case and that consequently the opening movement and closing movement in each case results from the difference between the hydraulic forces acting on the front area and rear area of the drive piston 47b. In this way, the opening movement and closing movement can be adapted by programmed control to the numerous requirements which arise from the respective type of molding to be produced and/or from the type of plastic material processed.

Figure 7:
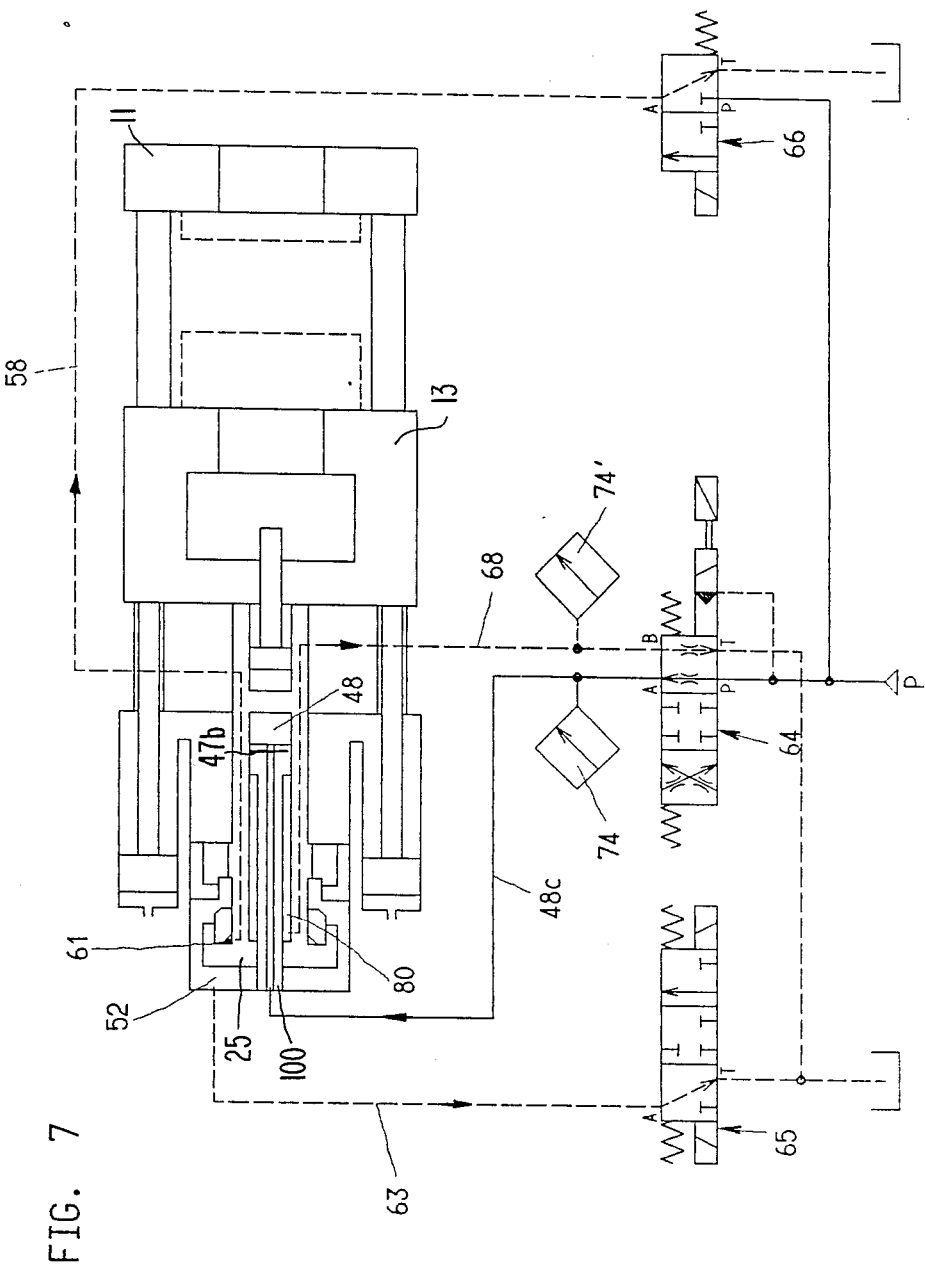

In Figs. 5, 7, only those flow paths of the hydraulic oil which exert the hydraulic force on the ram 47b of the drive cylinder 100 are indicated in each case.

In the sequence of an injection cycle of the injection molding machine, the hydraulic system operates as follows, starting from a closed injection mold 78: the injection mold is opened, as in FIG. 5 with small cylinder area and as in FIG. 8 with large cylinder area, the latter such that the hydraulic circuit as in FIG. 8 changes over, in accordance with the program, into a circuit as in FIG. 5, after slight separation of the mold halves. Then, the finished moldings are ejected from the open injection mold 78 with the aid of the ejection cylinder 27a. Thereafter, the injection mold is closed as in FIG. 7. During injection of the plastic material into the injection mold 78 and in a "holding pressure phase" until solidification of the plastics material in the injection mold, the injection mold is locked with great force as in FIG. 6.

The opening, closing, and locking of the injection mold is now described more fully. Referring to FIG. 5, the opening of the mold is accomplished using a small amount of force. The flow path of hydraulic oil is seen to flow from control valve 64 to cylinder space 80 via connecting passage 68 as indicated by a solid line and arrows. Thus, pressure is exerted against piston 47b of drive cylinder 100 in a direction away from stationary mold platen 11. Also, the oil flows from cylinder space 48 to control valve 64 via connecting passage 48c, from cylinder space 50 to slide valve 67 via connecting passage 68b, and from cylinder space 61 to slide valve 66 via connecting passage 58. Those flow paths from the cylinder spaces as indicated by broken lines and arrows. Accordingly, the injection mold is opened using a small amount of force.

Referring now to FIG. 8, the opening of the mold is accomplished when a greater amount of force is needed. To open the mold in such instances, the above described flows are obtained with respect to cylinder spaces 80 and 48. However, hydraulic oil flows from slide valve 67 to cylinder space 50 via connecting passage 68b and from slide valve 66 to cylinder space 61 via connecting passage 58. Thus, pressure is exerted against pistons 26 as well as stationary piston 47b in a direction away from stationary mold platen 11. Accordingly, the mold is opened with a greater force than shown in FIG. 5.

Referring now to FIG. 7, the closing of the mold is shown. Hydraulic oil flows from control valve 64 to cylinder space 48 via connecting passage 48c. Thus, pressure is exerted against stationary piston 47b of drive cylinder 100. Accordingly, mold platen 13 moves toward stationary mold platen 11. Also, oil flows from cylinder space 80 to control valve 64, from cylinder space 61 to slide valve 66, and from cylinder space 52 to slide valve 65 via connecting passage 63. Accordingly, the mold is closed.

Referring now to FIG. 6, the locking of the mold is shown. Appropriate equal pressure is maintained in both cylinder space 52 and cylinder space 48 to lock the mold into position while injection is performed. Thus, power piston 25 remains immobile during injection.

Last but not least, a further advantage of the hydraulic system is also to be seen in that, with it, a controlled locking of the injection mold is ensured. The piston rod 47 is secured on the cylinder flange 22 via the pin 47a by means of a nut 24, which is clamped to the assembly plate 12 by means of stay bars 23. The heads of the stay bars 23 are denoted by reference numeral 23b.

FIG. 6 shows that the connecting passage 48c leading from the control valve 64 to the cylinder space 48 of the drive cylinder 100 is put in connection with the high pressure space by means of multi-way slide valve 65, via a branching connecting passage 63, and as a result, the locking pressure, measured—in other words controlled—on one side by the pressure sensor 74 is built up, the low-pressure space 50 being switched to the tank 71 by means of multi-way slide valve 67. On the other hand, the control valve 64 provices the possibility of developing a pressure on its delivery side, and thus via the connecting passage 68 in the cylinder space 80 of the drive cylinder 100, and of controlling this pressure. This controlled pressure can be taken from the connecting passage 68 with the aid of the branching connecting passage 68b, with the aid of the multi-way slide valve 67 and also conveyed to the low pressure space 50. Consequently, during locking of the injection mold, it is possible to influence hydraulically, with a controlled pressure characteristic, both the power piston 25, from the low pressure space 50, and the piston 47b of the drive cylinder 100, from the cylinder space 80. Accordingly, there results, from the difference between the two-sided hydraulic influencing of the power piston 25 and of the piston 47b, a controlled locking pressure with pressure difference measurement via the pressure sensors, 74, 74'.

It will be understood, of course, that the foregoing disclosure describes only a preferred embodiment of the invention and that many variations and modifications of this example of the invention are possible within the spirit and scope of the appended claims.

What is claimed is:

1. A hydraulic actuator assembly for use in a mold clamping unit of an injection machine as a rapid-travel drive for mold opening and closing and as a source of elevated mold clamping pressure, which said mold clamping unit includes a movable mold platen guided for mold opening and closing, the hydraulic actuator assembly comprising:
   (a) a power cylinder for exerting elevated die closing pressures, the power cylinder having a power piston and a power piston rod coupled with the movable mold platen, the power piston dividing the power cylinder into a high pressure space on a rear side of the piston and a low pressure space on a forward side of the piston, the power piston rod having a hollow interior;
   (b) flow connection canals on the power piston for effecting communication between the low pressure space and the high pressure space, while the power piston is moving for die closing or opening;
   (c) a hydraulic valve having a pressure space and an annular piston for controlling said canals, said valve being controlled by a slide valve disposed in a connecting passage connecting the pressure space with a pump of the assembly;
   (d) compensating cylinders, each encircling a communicating space communicating with the low pressure space of said power cylinder by passages and further communicating with the high pressure space via the canals in the high pressure piston when the canals are opened; the compensating cylinders being arranged diametrically to said power cylinder, each compensating cylinder having a piston on a piston rod, each of said piston rods being connected with the movable mold plate for movement in unison with the power piston;
   (e) a hydraulic drive cylinder having a stationary hydraulic drive cylinder piston, the hydraulic drive cylinder being for rapid die closing and opening, the hydraulic drive cylinder being partially formed by the hollow interior of the power piston rod; the stationary hydraulic drive cylinder piston being a double acting piston with a pressure space on the rear side for opening and a pressure space on the forward side for die closing;
   (f) a control valve for controlling an opening movement and a closing movement of each of said compensating cylinders via a displacement detector for detecting displacements of the movable mold platen by a quantity program; a rear side connecting passage having a pressure sensor connecting the control valve with the rear side cylinder space, and a forward side connecting passage having a pressure sensor connecting the control valve with the forward side cylinder space, whereby the control valve communicates with both said low pressure space and said high pressure space for determining the drive speeds of drive cylinder in closing and opening directions, with simultaneous pressure influencing both sides of the drive cylinder piston in accordance with the quantity program via the displacement detector detecting the opening and closing of the movable mold platen and in accordance with a pressure control for selectively overriding the quantity program; and
   (g) a first branching connecting passage connecting the forward side connecting passage with the high pressure space for elevating closing pressure, which first branching connecting passage communicates with a first multi-way slide valve for exerting an elevated die closing pressure.

2. A hydraulic actuator assembly as defined in claim 1, wherein the die closing unit includes a stationary assembly plate to which the movable mold platen is displaceably coupled for movement with respect thereto, said power cylinder including a rear cylinder flange defining one end of the power cylinder, said assembly plate and said rear cylinder flange both including bores therein for conveying hydraulic fluid, including hydraulic passage sections, which sections take the form of sleeves, which sleeves connect with the bores in the assembly plate and rear cylinder flange.

3. A hydraulic actuator assembly as defined in claim 2 including a manifold plate on said movable platen, said manifold plate having bores therein, the bores in the manifold plate and the bores in the assembly plate constituting forward bores, all of the connecting passages leading through selected ones of the forward bores.

4. A hydraulic actuator assembly as defined in claim 1, wherein said rear side cylinder space of said drive cylinder includes a rear side end closest to the movable mold platen, said rear side cylinder space being bounded on said rear side end by a cup-shaped piece disposed in sealing relationship with the hollow interior of the power piston rod, and including in the cup-shaped piece an ejection piston, which, along with the cup-shaped piece, forms a hydraulic ejection cylinder for ejecting a workpiece from the mold.

5. A hydraulic actuator assembly as defined in claim 1 including a second multi-way slide valve and a second branching connecting passage communicating with said second multi-way slide valve, said second branching connecting passage connecting the second multi-way slide valve with the rear side connecting passage associated with the control valve, where said rear side connecting passage connects the control valve with the rear side cylinder space of the drive cylinder, said second branching connecting passage also connecting the second multi-way slide valve with the low pressure space of the power cylinder, whereby the rear side connecting passage associated with the control valve selectively communicates with the low pressure space of the power cylinder via the second multi-way slide valve.

6. A hydraulic actuator assembly as defined in claim 5 including a second branching connecting passage communicating with the multi-way slide valve, and a hydraulic fluid reservoir connected with said first multi-way slide valve, said first branching connecting passage connecting the first multi-way slide valve with the forward side connecting passage associated with the control valve, said first branching connecting passage also connecting the first multi-way slide valve with the high pressure space of the power cylinder, whereby the connecting passage associated with the control valve selectively communicates with the high pressure space of the power cylinder via the first multi-way slide valve, at which time the low pressure space of the power cylinder is switched into communication with the reservoir via the second multi-way slide valve.

7. A hydraulic actuator assembly as defined in claim 6, wherein the control valve communicates via the forward side connecting passage with the rear side cylinder space of the drive cylinder and at the same time communicates with the high pressure space of the power cylinder via the first branching connecting passage and via the first multi-way slide valve, and wherein the control valve also communicates via the rear side connecting passage with the forward side cylinder space of the drive cylinder and with the low pressure space of the power piston via the second multi-way slide valve and via the second branching connecting passage.

8. A hydraulic actuator assembly as defined in claim 1, including an assembly bracket on the mold clamping unit, said displacement detector being arranged on said assembly bracket.

9. A hydraulic actuator assembly as defined in claim 1, wherein the power piston includes a bypass channel connecting the high and low pressure spaces of the power cylinder, said power cylinder including a plunger cooperating with the power piston for selectively opening and closing the bypass channel, the plunger taking the form of a simple cylindrical sleeve.

10. A hydraulic actuator assembly as defined in claim 9, wherein the drive cylinder is defined at an end remote from the mold by a rear cover, said rear cover including an axial ring flange, said axial ring flange overlapping the cylindrical sleeve which forms the plunger for controlling the bypass channel of the power piston.

11. A hydraulic actuator assembly as defined in claim 1, wherein the displacement detector is a linear displacement voltage transformer.

* * * * *